Sept. 1, 1964   E. L. CIRESE   3,146,815
SLICING AND HOLDING BOARD
Filed Aug. 23, 1962   2 Sheets-Sheet 1
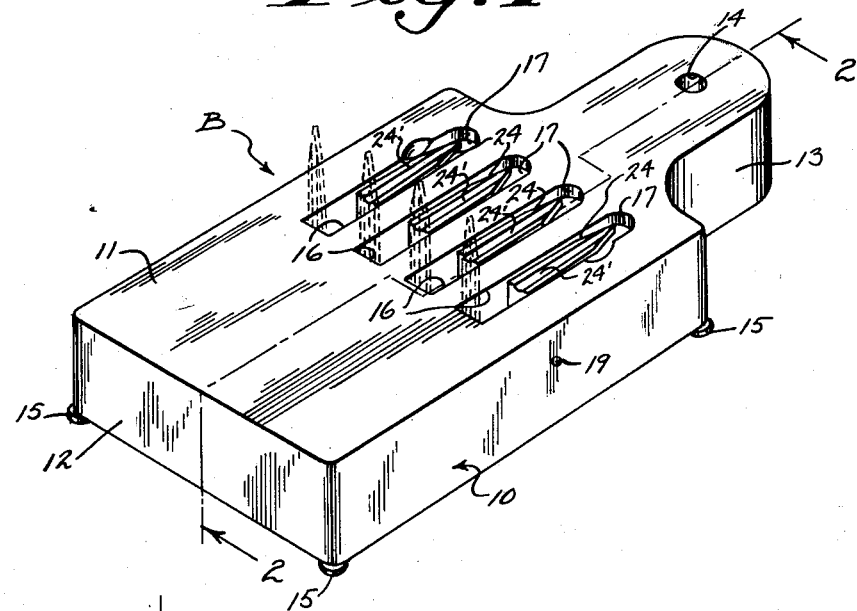
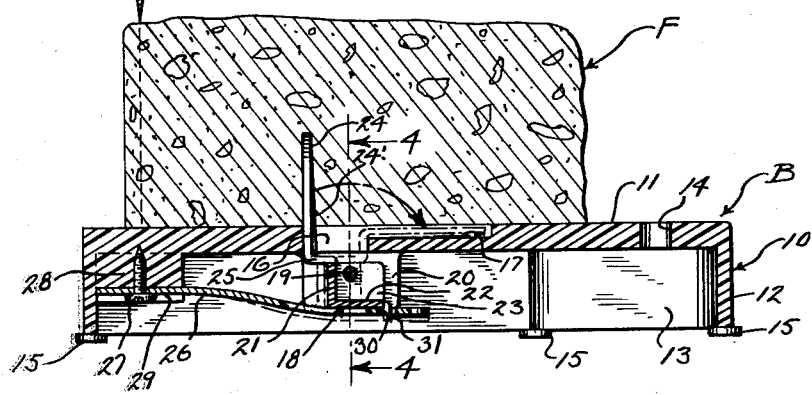
INVENTOR
EUGENE L. CIRESE
BY
*Wright & Wright*
ATTORNEYS Sept. 1, 1964  E. L. CIRESE  3,146,815
SLICING AND HOLDING BOARD
Filed Aug. 23, 1962  2 Sheets-Sheet 2
Fig. 3
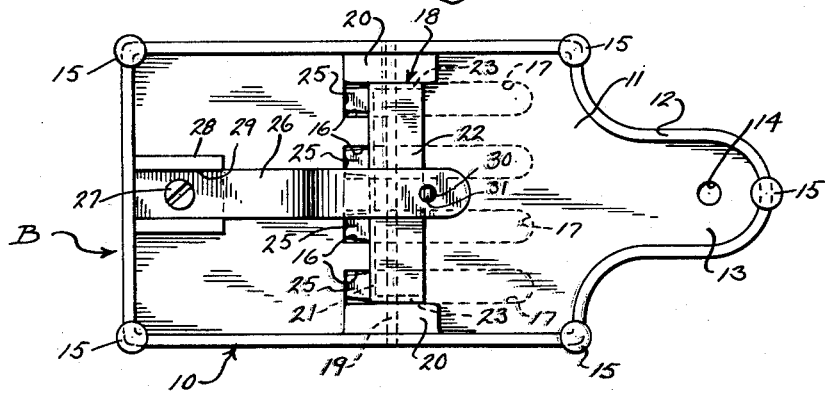
Fig. 4
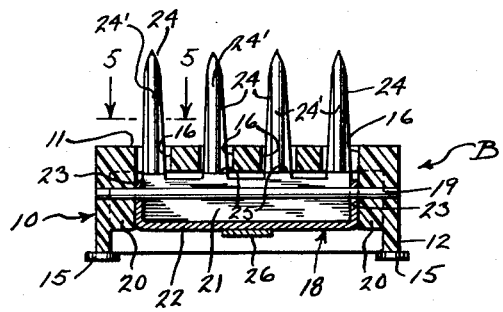
Fig. 5
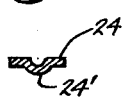
Fig. 6
INVENTOR
EUGENE L. CIRESE
BY *Wright & Wright*
ATTORNEYS

United States Patent Office 3,146,815
Patented Sept. 1, 1964

3,146,815
SLICING AND HOLDING BOARD
Eugene L. Cirese, San Jose, Calif., assignor to Moeller Manufacturing Company, Inc., Greenville, Miss., a corporation of Wisconsin
Filed Aug. 23, 1962, Ser. No. 218,997
2 Claims. (Cl. 146—215)

This invention appertains to cutting and slicing boards for food and food products, such as cheese and meats, including meat loaves and sausage, and more particularly to a kitchen article for holding food on a board during a slicing operation.

One of the primary objects of the invention is to provide a kitchen utensil of a small compact nature embodying a cutting board having associated therewith holding tines or prongs on which the food to be cut is impaled, the tines or prongs being associated with the board in a novel manner, so that when the tines or prongs are not being used the same can be swung to a complete out-of-the-way position below the surface of the board for safe handling and storing of the board.

Another salient object of the invention is to provide a slicing and holding board preferably molded from plastic material embodying a top plate on which the food rests and a depending skirt or rim defining a holder base, the base having mounted therein and carried by the rim, a bar having formed thereon the holding tines which extend through the plate, the bar being rockable to move the tines to a raised vertical position for holding the food and to another position with the tines in a lowered horizontal position, the plate having grooves for receiving the tines when the same are in a lowered horizontal position parallel with the base.

A further prime object of the invention is the provision of means for normally holding the bar and its tines against accidental swinging movement when the tines are in their lowered position, with means for positively locking and holding the bar and the tines when the tines are in their raised vertical holding position.

A still further object of the invention is to provide a food holding and slicing board of a simplified nature, which can be placed upon the market at a reasonable price and which will effectively accomplish the intended purpose.

With these and other objects in view, the invention consists in the novel construction, arrangement and formation of parts, as will be hereinafter more specifically described and claimed and illustrated in the accompanying drawings, in which drawings, FIGURE 1 is a perspective view of the combined holding and slicing board with the tines in their lowered non-operative position in full lines and in their raised operative position in dotted lines;

FIGURE 2 is a central longitudinal sectional view through the combined holding and slicing board showing the same in use with the tines in their raised operative food holding position, the section being taken on the line 2—2 of FIGURE 1, looking in the direction of the arrows, the view also showing in dotted lines the tines in their lowered non-operative position;

FIGURE 3 is a bottom plan view of the holding and slicing board, the tines being shown in their raised locked position;

FIGURE 4 is a transverse sectional view through the board taken on the line 4—4 of FIGURE 2, looking in the direction of the arrows;

FIGURE 5 is a detail transverse sectional view through one of the tines or prongs, the section being taken on the line 5—5 of FIGURE 4, looking in the direction of the arrows, and FIGURE 6 is a fragmentary central longitudinal sectional view similar to FIGURE 2 but showing a slightly modified form of latch.

Referring to the drawings in detail, wherein similar reference characters designate corresponding parts throughout the several views, the letter B generally indicates the cutting and holding board, and the same includes a base 10 preferably molded from a desired type of thermoplastic and of a preferred color.

The base 10 includes a flat top plate 11 and a depending rim or skirt 12, and this plate and rim define a hollow structure, for a purpose, which will later appear. The plate 11 and the rim 12 narrow at one end to provide a holding handle 13. This handle portion 13 can be provided with an opening or eye 14 whereby the board can be suspended from a supporting hook, when the same is not being used. The base at appropriate points can be provided with feet 15 to prevent the marring of a surface on which the board is placed. The plate 11 is provided with a transversely extending row of slots 16, and the upper surface of the board has formed therein longitudinally extending sets of grooves 17 which open into the slots 16.

Rockably mounted within the base 10 is a transversely extending bar 18. The bar 18 is journalled on a transversely extending shaft 19 carried by the sides of the rim 12. The rim 12 and plate 11 can be reinforced, as at 20, for effectively supporting the shaft 19.

The rockable bar 18 is preferably made from a metal stamping and the same is of an L or angle shape in cross-section and hence includes right-angularly extending walls 21 and 22. The wall 2 can have bent up from the ends thereof end walls 23 and it is these end walls that receive the shaft 19. Formed on the outer edge of the wall 21 are equidistantly spaced piercing prongs or tines 24 and these prongs or tines extend through the slots 16. The tines or prongs 24 at their points of juncture with the wall 21 are slightly offset, as at 25, so as to provide right-angularly extending shoulders, the purpose of which will later appear. As these prongs are formed from sheet metal it is desirable to provide the same with longitudinally extending struck out ribs 24' for strength.

When the rockable bar is in the position shown in full lines in FIGURES 2 and 4, the tines or prongs 24 project upright through the slots in a vertical position and at this time the article of food F (shown in FIGURE 2) can be impaled thereon and the article of food will be held on the base flat against the upper surface of the plate 11. When the bar 18 is rocked on the shaft 19 to its second position, the tines or prongs 24 will lie parallel with the top plate 11 and in the grooves 17. This is best shown in dotted lines in FIGURE 2, and it is to be noted that the offset shoulders 25 permit the effective movement of the tines or prongs into the grooves 17. Hence, when the tines are not in use the same lie entirely within the grooves 17 and below the upper surface of the plate 11. Therefore, the same are entirely out of the way and persons handling the board B are protected from injury.

It is highly desirable to provide means for preventing the accidental rocking of the bar and for providing a positive means for locking the bar in one position with the tines or bars upright at right angles to the board and this means forms an important feature of the invention. The holding and locking means cooperates with the rocking bar 18 in a novel manner. This means includes a flat leaf spring 26. The spring projects forwardly from one end of the base toward and under the bar for firm contact therewith. The outer end of the spring 26 is rigidly secured by means of a fastening element 27 to the lower face of the top plate 11 and the top plate can be provided with a depending enlargement or block 28 for receiving the fastening element. To prevent twisting of the spring on the fastening element, the enlargement or block 28 has formed on its lower surface a groove 29 in which the outer end of the spring is fitted. The side edges of the spring engage the side walls of the groove. The tension of the spring is such that the same bears against the rocking bar to releasably hold the rocking bar against accidental turning movement and when the bar is turned so that the prongs or tines lie in the grooves 17 the spring will engage the edge of the wall 22. This wall 22 also constitutes a fingerpiece for facilitating the rocking of the bar on the shaft 19.

As heretofore brought out, it is desirable to releasably lock the bar against turning movement when the prongs are in their upright position for holding the article of food. Hence, the spring has formed therein a keeper opening 30 and the wall 22 has formed thereon or secured thereto a latch lug 31 and this latch lug is adapted to spring into the keeper opening 30 when the bar is turned to position the tines or prongs in a vertical position. As illustrated in the drawings the latch lug 30 is preferably formed by providing a right-angularly extending tongue on the central forward edge of the plate 22.

With the tines in a raised position and when it is desired to lower the tines or prongs, it is merely necessary to flex the spring 26 downwardly to move the latch lug 31 out of the keeper opening 30 and to then push the wall 22 to a vertical position.

It can be seen that with the article of food impaled on the tines that the food will be firmly held and that the food can then be easily cut into the desired slices. This is best shown in FIGURE 2. As the food is cut in slices up to the tines, it is merely necessary to remove the food from the tines and then advance the food forwardly and impale the same again on the tines.

In FIGURE 6 I have shown a slightly modified form of latch and in this form the latch spring 26 engages in rear of the latch lug 31, when the tines are in their raised position. Thus, the provision of the keeper opening 30 is eliminated and the tines or prongs are held against swinging movement in one direction by their engagement with the plate 11 and in the opposite direction by the engagement of the spring with the lug 31.

From the foregoing description, it can be seen that an exceptionally simple food cutting and holding board has been provided that can be manufactured at a small cost. It is to be also noted that the board will present a pleasing and attractive appearance which will catch the eye of discriminating purchasers.

Changes in details may be made without departing from the spirit or the scope of this invention, but what I claim as new is:

1. A holding and slicing board comprising a hollow base, having a flat top plate and depending marginal rim, said top plate having a transversely extending row of slots therein opening out through the upper and lower faces of the plate and said plate also having longitudinally extending grooves in its upper face opening into said slots, a rock bar housed within said hollow base including right angularly extending side walls and end walls, a supporting shaft extending through said end walls and mounted in said rim for rockably supporting said bar, a plurality of equidistantly spaced offset prongs formed on one wall and adapted to extend upright through the slots at right angles to the plate when the bar is in one position, said prongs when in their upright position engaging a respective wall of said slots opposite said grooves, said bar being movable to swing the prongs in a lowered position parallel with said plate and in said grooves with the opposite portions of said prongs engaging the bottom of said grooves, a spring disposed within said hollow base and rigidly secured to said base at its outer end, the inner end of said spring lying under the bar for frictional contact therewith to hold the same against accidental swinging movement and said spring having a keeper opening therein, and a latch lug formed on the other side wall of the bar and movable into the latch opening when the bar is turned to position the prongs in an upright vertical position.

2. A holding and slicing board comprising a hollow base including a flat top plate and a depending marginal rim, said plate having a transverse row of slots therein opening out through the top and bottom face thereof and said plate also having a plurality of longitudinally extending grooves in its upper face opening into said slots, a rock bar pivotally carried by the rim and disposed wholly within the hollow base and said bar being of a polygonal shape in cross-section, a plurality of prongs carried by the bar and movable with the bar to two positions, one of said positions being with the prongs extending upright through the slots and engaging the respective end walls opposite said grooves of the slots and at right angles to the plate and the other of said positions being with the bar turned and the prongs lying parallel with the plate and in said grooves and engaging the bottom of said grooves, a flat leaf psring rigidly secured at one end to said base and housed therein and having its forward end lying under said bar to releasably hold the bar against accidental swinging movement, and a latch lug carried by said rock bar and movable into engagement with the forward end of said spring for cooperating with said prongs and slot walls to hold the prongs positively against movement until the spring is moved away from said latch bar.

References Cited in the file of this patent
UNITED STATES PATENTS

| | | |
|---|---|---|
| 752,166 | Hawkins | Feb. 16, 1904 |
| 2,777,488 | Gilbert et al. | Jan. 15, 1957 |

FOREIGN PATENTS

| | | |
|---|---|---|
| 551,012 | France | Dec. 23, 1922 |